US012562462B2

(12) United States Patent
Xue et al.

(10) Patent No.: US 12,562,462 B2
(45) Date of Patent: Feb. 24, 2026

(54) ELECTRONIC ASSEMBLY AND ELECTRONIC DEVICE

(71) Applicant: Honor Device Co., Ltd., Shenzhen (CN)

(72) Inventors: Kangle Xue, Shenzhen (CN); Xijian Di, Shenzhen (CN); Shouliang Li, Shenzhen (CN); Zhenrui Tang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 61 days.

(21) Appl. No.: 18/730,710

(22) PCT Filed: Aug. 17, 2023

(86) PCT No.: PCT/CN2023/113606

§ 371 (c)(1),
(2) Date: Jul. 19, 2024

(87) PCT Pub. No.: WO2024/051466

PCT Pub. Date: Mar. 14, 2024

(65) Prior Publication Data

US 2025/0105492 A1 Mar. 27, 2025

(30) Foreign Application Priority Data

Sep. 7, 2022 (CN) ......................... 202211090616.3

(51) Int. Cl.
*H01Q 1/24* (2006.01)

(52) U.S. Cl.
CPC .................................. *H01Q 1/243* (2013.01)

(58) Field of Classification Search
CPC ...................................................... H01Q 1/243
See application file for complete search history.

(56) References Cited

U.S. PATENT DOCUMENTS

2015/0155614 A1 6/2015 Youn et al.
2021/0044003 A1 2/2021 Ma et al.
2022/0037791 A1 2/2022 Li
(Continued)

FOREIGN PATENT DOCUMENTS

CN 108270071 A 7/2018
CN 111816985 A 10/2020
CN 112421210 A 2/2021
(Continued)

*Primary Examiner* — Graham P Smith
(74) *Attorney, Agent, or Firm* — Leydig, Voit & Mayer, Ltd.

(57) ABSTRACT

This application provides an electronic assembly and an electronic device. At least two antennas are formed on a metal frame of the electronic assembly, a circuit board and an electronic component are located on one side of the metal frame, and there is a gap between the metal frame and each of the circuit board and the electronic component. An orthographic projection of the electronic component on the metal frame covers a first antenna, a slit between the first antenna and a second antenna, and a part of the second antenna. One end of a first extension member is connected to one end of the first antenna which is close to the second antenna, the other end of the first extension member is electrically connected to a first feed point on the circuit board. The second antenna is electrically connected to a second feed point on the circuit board.

20 Claims, 14 Drawing Sheets

(56) References Cited

U.S. PATENT DOCUMENTS

| | | | |
|---|---|---|---|
| 2024/0021982 | A1 | 1/2024 | Wu et al. |

FOREIGN PATENT DOCUMENTS

| | | | |
|---|---|---|---|
| CN | 213753021 | U | 7/2021 |
| CN | 214313508 | U | 9/2021 |
| CN | 113794052 | A | 12/2021 |
| CN | 111816985 | B | 4/2022 |
| CN | 114614242 | A | 6/2022 |
| CN | 116435787 | A | 7/2023 |
| KR | 1020190086160 | A | 7/2019 |

ELECTRONIC ASSEMBLY AND ELECTRONIC DEVICE

CROSS-REFERENCE TO RELATED APPLICATIONS

This application is a national stage of International Application No. PCT/CN2023/113606, filed on Aug. 17, 2023, which claims priority to Chinese Patent Application No. 202211090616.3, filed on Sep. 7, 2022. The disclosures of both of the aforementioned applications are hereby incorporated by reference in their entireties.

TECHNICAL FIELD

Embodiments of this application relate to the field of terminal technologies, and in particular, to an electronic assembly and an electronic device.

BACKGROUND

With continuous development of communication technologies, wireless performance of electronic devices such as a mobile phone and a computer receives increasingly more attention. Therefore, antenna technologies are more widely applied to the electronic devices, with an increasingly high requirement.

An example in which the electronic device is a mobile phone is used. Generally, different antenna structures are designed at different spatial positions on the mobile phone. Specifically, different resonant antennas may be arranged at different positions in space in the mobile phone based on actual scenario requirements, to meet antenna requirements in different scenarios. In a related technology, when an antenna is disposed in the mobile phone, the antenna is mainly disposed on a housing or a middle frame of the mobile phone. For example, for an electronic device with an ID of a metal frame and a glass battery cover, in a conventional antenna design solution, a plurality of segments of antennas are generally formed by disposing a slit on the metal frame, a feed point is disposed on a circuit board of the mobile phone, and the feed point is electrically connected to the antenna, to implement feeding of the antenna.

However, in the foregoing design solution, spatial interference easily occurs between the antenna, the slit between two adjacent antennas, and the feed point. Consequently, an adverse impact is caused on feeding of the antenna.

SUMMARY

Embodiments of this application provide an electronic assembly and an electronic device, so that spatial interference between an antenna, a slit between two adjacent antennas, and a feed point can be avoided, and an adverse impact on feeding of the antenna can be avoided.

According to a first aspect, an embodiment of this application provides an electronic assembly, including at least a circuit board, an electronic component, and a metal frame. At least one slit is disposed on the metal frame, so that at least two antennas are formed on the metal frame. The circuit board and the electronic component are located on one side of the metal frame, and there is a gap between the metal frame and each of the circuit board and the electronic component.

The at least two antennas include at least a first antenna and a second antenna, an orthographic projection of the electronic component on the metal frame covers the first antenna, the slit between the first antenna and the second antenna, and a part of the second antenna, and an orthographic projection of the circuit board on the metal frame covers a part of the second antenna.

The electronic assembly further includes a first extension member, one end of the first extension member is connected to an end that is of the first antenna and that is close to the second antenna, and the other end of the first extension member extends into the gap, and is electrically connected to a first feed point on the circuit board. The second antenna is electrically connected to a second feed point on the circuit board.

According to the electronic assembly provided in this embodiment of this application, in the electronic assembly, at least one slit is disposed on the metal frame, so that at least two antennas are formed on the metal frame. Two antennas are used as an example. The orthographic projection of the electronic component on the metal frame covers the first antenna, the slit between the first antenna and the second antenna, and a part of the second antenna. The orthographic projection of the circuit board on the metal frame covers a part of the second antenna. In this case, the second antenna is opposite to the circuit board, and the second antenna is electrically connected to the second feed point on the circuit board. The first extension member is disposed. One end of the first extension member is connected to the end that is of the first antenna and that is close to the second antenna, and the other end of the first extension member extends into the gap, and is electrically connected to the first feed point on the circuit board. In this way, spatial interference between the first antenna, the second antenna, the slit between the first antenna and the second antenna, and the first feed point and the second feed point on the circuit board can be avoided, so that an adverse impact on feeding of the first antenna and the second antenna can be avoided.

In a possible implementation, there is a distance between the first extension member and a surface that is of the second antenna and that faces the electronic component.

There is a distance between the first extension member and the surface that is of a second metal frame and that faces the electronic component, so that position interference between the second metal frame and the first extension member can be avoided. Because a feeding connection between the first antenna and the first feed point on the circuit board is implemented by using the first extension member, an adverse impact on the feeding connection between the first antenna and the first feed point on the circuit board can be avoided.

In a possible implementation, the distance between the first extension member and the surface that is of the second antenna and that faces the electronic component is 0.1 mm-2 mm.

In a possible implementation, the metal frame includes a first part and a second part, one end of the second part is connected to the first part, and the other end of the second part is bent toward the electronic component; the second part and the first extension member are staggered from each other in a first direction; and the first direction is a thickness direction of the electronic device.

The metal frame includes the first part and the second part. The second part of the metal frame and the first extension member are staggered from each other in the thickness direction of the electronic device. Therefore, it can be ensured that position interference between the second metal frame and the first extension member is avoided, so that an adverse impact on the feeding connection between the first antenna and the first feed point on the circuit board can be avoided.

In a possible implementation, the metal frame includes a first part and a second part, one end of the second part is connected to the first part, and the other end of the second part is bent toward the electronic component; the second part at least partially overlaps the first extension member in a first direction; and the first direction is a thickness direction of the electronic device.

The metal frame includes the first part and the second part. The second part of the metal frame at least partially overlaps the first extension member in the thickness direction of the electronic device. Therefore, it can also be ensured that position interference between the second metal frame and the first extension member is avoided, so that an adverse impact on the feeding connection between the first antenna and the first feed point on the circuit board can be avoided.

In a possible implementation, the first extension member includes a first extension part and a second extension part connected to the first extension part; and one end of the first extension part is connected to the first antenna, the other end of the first extension part is connected to one end of the second extension part, and the other end of the second extension part is electrically connected to the first feed point.

The first extension member is designed to include the first extension part and the second extension part. One end of the first extension part is connected to the first antenna, the other end of the first extension part is connected to one end of the second extension part, and the other end of the second extension part is electrically connected to the first feed point on the circuit board. In this way, the feeding connection between the first antenna and the first feed point on the circuit board can be implemented, so that the first feed point on the circuit board can feed the first antenna well.

In a possible implementation, a projection of the first extension part in a direction perpendicular to the first direction is located on the first antenna and within the slit between the first antenna and the second antenna; and a projection of the second extension part in the direction perpendicular to the first direction is located on the second antenna.

In this way, the first extension part and the second extension part do not stack in the first direction (namely, the thickness direction of the electronic device). This does not increase a thickness of the electronic device, thereby saving space in the electronic device.

In a possible implementation, the electronic assembly further includes a first electrical connection member, where the first extension member is electrically connected to the first feed point by using the first electrical connection member.

The first electrical connection member is designed, one end of the first electrical connection member is connected to the first extension member, and the other end of the first electrical connection member is electrically connected to the first feed point on the circuit board. Therefore, an electrical connection between the first extension member and the first feed point on the circuit board can be implemented, and an electrical connection between the first antenna and the first feed point on the circuit board can be implemented, so that the first feed point on the circuit board can feed the first antenna well.

In a possible implementation, the electronic assembly further includes a second electrical connection member, where the second antenna is electrically connected to the second feed point by using the second electrical connection member.

The second electrical connection member is designed, one end of the second electrical connection member is connected to the second antenna, and the other end of the second electrical connection member is electrically connected to the second feed point on the circuit board. Therefore, an electrical connection between the second antenna and the second feed point on the circuit board can be implemented, so that the second feed point on the circuit board can feed the second antenna well.

In a possible implementation, the at least two antennas further include a third antenna; the second antenna is located between the first antenna and the third antenna; and the electronic device further includes a second extension member, one end of the second extension member is connected to an end that is of the third antenna and that faces the second antenna, and the other end of the second extension member extends into the gap between the third antenna and the second antenna, and is electrically connected to a third feed point on the circuit board.

The second antenna is located between the first antenna and the third antenna. The second extension member is disposed, one end of the second extension member is connected to the end that is of the third antenna and that faces the second antenna, and the other end of the second extension member extends into the gap between the third antenna and the second antenna, and is electrically connected to the third feed point on the circuit board. In this way, the third antenna is electrically connected to the third feed point on the circuit board by using the second extension member, and a feeding connection between the third antenna and the third feed point on the circuit board can be implemented, so that the third feed point on the circuit board can feed the third antenna well.

In a possible implementation, the at least two antennas further include a third antenna; the first antenna is located between the second antenna and the third antenna; and the electronic device further includes a second extension member, one end of the second extension member is connected to an end that is of the third antenna and that faces the first antenna, and the other end of the second extension member extends into the gap between the third antenna and the first antenna, and is electrically connected to a third feed point on the circuit board.

The first antenna is located between the second antenna and the third antenna. The second extension member is disposed, one end of the second extension member is connected to the end that is of the third antenna and that faces the first antenna, and the other end of the second extension member extends into the gap between the third antenna and the first antenna, and is electrically connected to the third feed point on the circuit board. In this way, the third antenna is electrically connected to the third feed point on the circuit board by using the second extension member, and a feeding connection between the third antenna and the third feed point on the circuit board can be implemented, so that the third feed point on the circuit board can feed the third antenna well.

In a possible implementation, the electronic assembly further includes a third electrical connection member, where the second extension member is electrically connected to the second feed point by using the third electrical connection member.

The third electrical connection member is designed, one end of the third electrical connection member is connected to the second extension member, and the other end of the third electrical connection member is electrically connected to the third feed point on the circuit board. Therefore, an electrical connection between the second extension member and the third feed point on the circuit board can be implemented, and an electrical connection between the third antenna and the third feed point on the circuit board can be implemented, so that the third feed point on the circuit board can feed the third antenna well.

In a possible implementation, the electronic assembly further includes a plastic frame, where the plastic frame is connected to the metal frame, and the plastic frame is located on one side that is of the metal frame and that faces the electronic component.

In a possible implementation, the electronic component is a speaker, a camera, a motor, or a SIM card.

According to a second aspect, an embodiment of this application provides an electronic device, including at least a display screen, a housing, and the foregoing electronic assembly, where the display screen and the housing are respectively located on two sides of the electronic assembly.

According to the electronic device provided in this embodiment of this application, the electronic device includes at least the electronic assembly, and in the electronic assembly, at least one slit is disposed on the metal frame, so that at least two antennas are formed on the metal frame. Two antennas are used as an example. The orthographic projection of the electronic component on the metal frame covers the first antenna, the slit between the first antenna and the second antenna, and a part of the second antenna. The orthographic projection of the circuit board on the metal frame covers a part of the second antenna. In this case, the second antenna is opposite to the circuit board, and the second antenna is electrically connected to the second feed point on the circuit board. The first extension member is disposed. One end of the first extension member is connected to an end that is of the first antenna and that is close to the second antenna, and the other end of the first extension member extends into the gap, and is electrically connected to the first feed point on the circuit board. In this way, spatial interference between the first antenna, the second antenna, the slit between the first antenna and the second antenna, and the first feed point and the second feed point on the circuit board can be avoided, so that an adverse impact on feeding of the first antenna and the second antenna can be avoided.

In a possible implementation, the electronic device is a foldable screen electronic device; the display screen includes an outer screen body, a first inner screen body, and a second inner screen body, and the metal frame of the electronic assembly includes a first metal frame and a second metal frame; and the first inner screen body and the second inner screen body are located between the outer screen body and the housing, one end of the first metal frame is connected to the outer screen body, the other end of the first metal frame is connected to the first inner screen body, one end of the second metal frame is connected to the second inner screen body, and the other end of the second metal frame is connected to the housing.

DESCRIPTIONS OF REFERENCE NUMERALS

200—electronic device; 210—display screen; 211—first hole;

212—outer screen body; 2121—glass cover; 2122—display module;

213—first inner screen body; 214—second inner screen body; 220—middle frame;

221—metal middle plate; 222—frame; 222*a*—plastic frame;

2221—top border; 2222—bottom border; 2223—left border;

2224—right border; 230—circuit board; 240—battery;

250—housing; 251—second hole; 260—front—facing camera module;

270—rear—facing camera module; 280—electronic component; 100—metal frame;

1001—first metal frame; 1002—second metal frame; 100*a*—slit;

100*b*—gap; 110—first antenna; 120—second antenna;

130—first extension member; 131—first extension part; 132—second extension part;
130*a*—distance; 140—first part; 150—second part;
160—first electrical connection member; 170—second electrical connection member;
L1—first direction.

DESCRIPTION OF EMBODIMENTS

Terms used in the implementation part of this application are merely intended to explain specific embodiments of this application, and are not intended to limit this application. Implementations of the embodiments of this application are described in detail below with reference to the accompanying drawings.

Embodiments of this application provide an electronic device that may include, but is not limited to, a mobile or fixed terminal having an antenna, for example, a mobile phone, a tablet computer, a notebook computer, an ultra-mobile personal computer (UMPC), a handheld computer, a walkie-talkie, a netbook, a point of sales (POS) device, a personal digital assistant (PDA), a wearable device, a virtual reality device, a wireless universal serial bus (USB) flash, a Bluetooth speaker/headset, a factory-installed vehicle component, an event data recorder, or a security device.

Figure 1A:
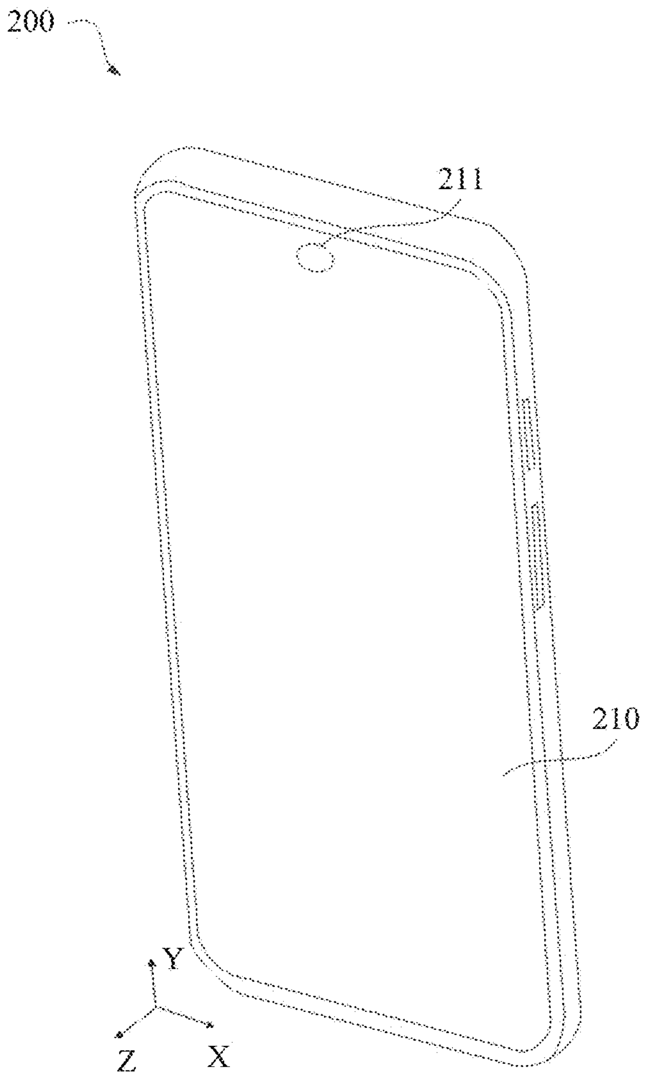
FIG. 1A is a schematic diagram of a structure of an electronic device according to an embodiment of this application.
Figure 1B:
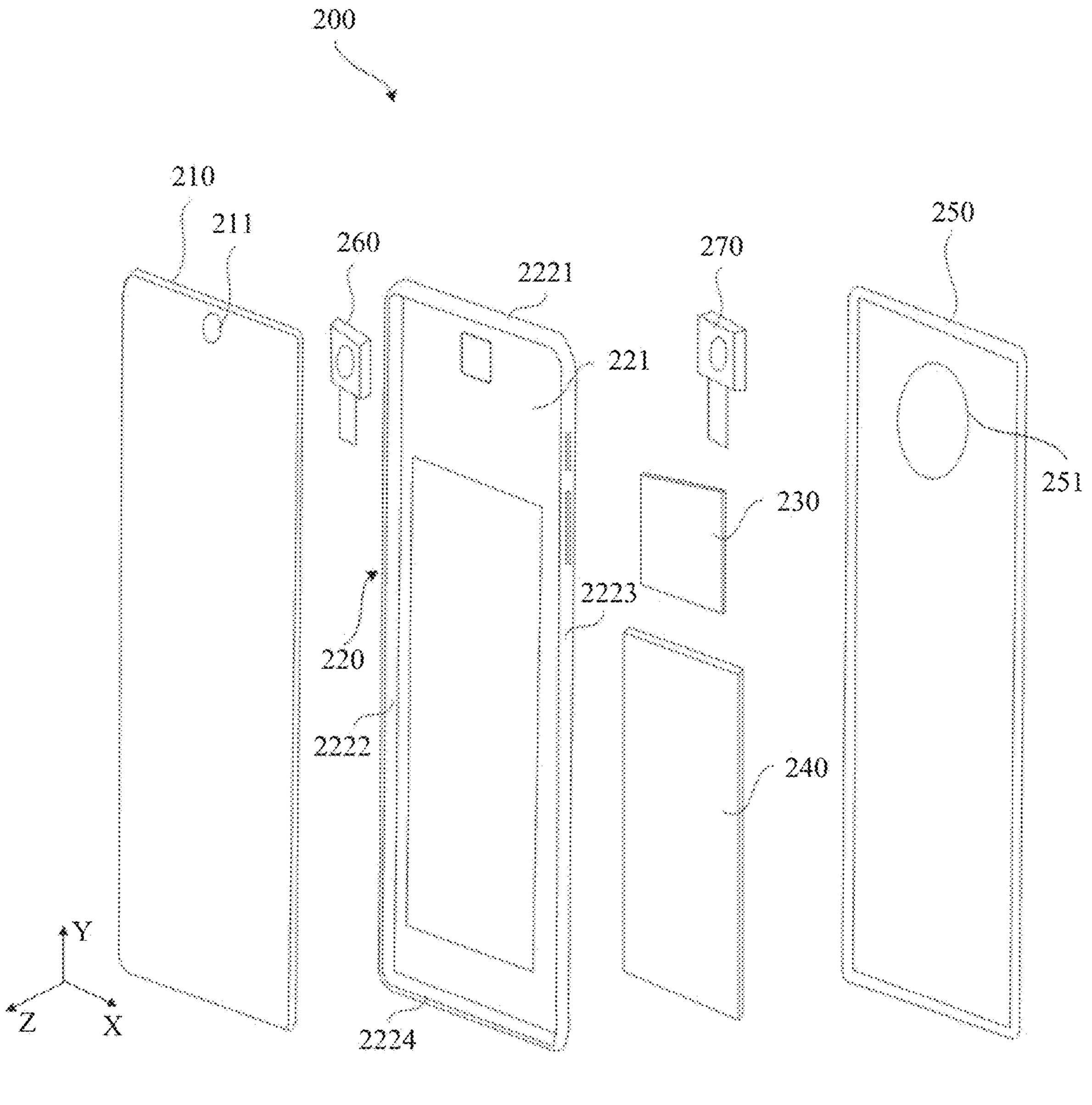
FIG. 1B is an exploded view of FIG. 1A.

Referring to FIG. 1A and FIG. 1B, in the embodiments of this application, that the electronic device is a mobile phone is used as an example for description. The mobile phone provided in the embodiments of this application may be a curved-screen mobile phone or a flat-screen mobile phone, and may be a bar-type mobile phone or a foldable screen mobile phone. In the embodiments of this application, the flat-screen mobile phone is used as an example for description.

FIG. 1A and FIG. 1B respectively show an integral structure and a split structure of a bar-type mobile phone. A display screen 210 of the mobile phone provided in the embodiments of this application may be a water drop screen, a notch screen, a full screen, or a hole-punch screen (refer to FIG. 1A). For example, a first hole 211 is disposed on the display screen 210. The following is described by using the hole-punch screen as an example.

Referring to FIG. 1B, the mobile phone may include a display screen 210, a middle frame 220, a housing 250, and a battery 240 located between the middle frame 220 and the housing 250. The battery 240 may be disposed on a surface that is of the middle frame 220 and that faces the housing 250 (as shown in FIG. 1B), or the battery 240 may be disposed on a surface that is of the middle frame 220 and that faces the display screen 210. For example, the surface that is of the middle frame 220 and that faces the housing 250 may have a battery compartment (not shown in the figure), and the battery 240 is mounted in the battery compartment.

In some other examples, the mobile phone may further include a circuit board 230. The circuit board 230 may be disposed on the middle frame 220. For example, the circuit board 230 may be disposed on the surface that is of the middle frame 220 and that faces the housing 250 (as shown in FIG. 1B), or the circuit board 230 may be disposed on the surface that is of the middle frame 220 and that faces the display screen 210. The display screen 210 and the housing 250 are respectively located on two sides of the middle frame 220.

The battery 240 may be connected to the circuit board 230 by using a power management module and a charging management module. The power management module receives an input of the battery 240 and/or the charging management module, and supplies power to a processor, an internal memory, an external memory, the display screen 210, camera modules (for example, a front-facing camera module 260 and a rear-facing camera module 270 in FIG. 1B), a communication module, and the like. The power management module may be further configured to monitor parameters such as a capacity of the battery 240, a cycle count of the battery 240, and a state of health (leakage or impedance) of the battery 240. In some other embodiments, the power management module may alternatively be disposed in the processor of the circuit board 230. In some other embodiments, the power management module and the charging management module may alternatively be disposed in a same component.

When the mobile phone is a flat screen mobile phone, the display screen 210 may be an organic light-emitting diode (OLED) display screen, or may be a liquid crystal display (LCD). When the mobile phone is a curved-screen mobile phone, the display screen 210 may be an OLED display screen.

Still referring to FIG. 1B, the middle frame 220 may include a metal middle plate 221 and a frame 222, and the frame 222 is disposed around a periphery of the metal middle plate 221 for one circle. Generally, the frame 222 may include a top border 2221, a bottom border 2222, a left border 2223, and a right border 2224, and the top border 2221, the bottom border 2222, the left border 2223, and the right border 2224 enclose to form the frame 222 of a square ring structure. A material of the metal middle plate 221 includes but is not limited to an aluminum plate, aluminum alloy, stainless steel, a steel-aluminum composite die-casting plate, titanium alloy, magnesium alloy, or the like. The frame 222 may be a metal frame, a ceramic frame, or a glass frame. When the frame 222 is a metal frame, a material of the metal frame includes but is not limited to an aluminum alloy, stainless steel, a steel-aluminum composite die-casting plate, a titanium alloy, or the like. The metal middle plate 221 may be connected to the frame 222 through clamping, welding, bonding, or integral molding, or the metal middle plate 221 may be fixedly connected to the frame 222 through injection molding.

Referring to FIG. 1B, the top border 2221 and the bottom border 2222 are opposite to each other, the left border 2223 and the right border 2224 are opposite to each other, the top border 2221 is separately connected to one end of the left border 2223 and one end of the right border 2224 to form rounded corners, and the bottom border 2222 is separately connected to the other end of the left border 2223 and the other end of the right border 2224 to form rounded corners, to jointly form a round-cornered rectangular region. A ground surface of the housing is disposed in the round-cornered rectangular region, and is separately connected to the top border 2221, the bottom border 2222, the left border 2223, and the right border 2224. It may be understood that the ground surface of the housing may be the housing 250 of the mobile phone.

The housing 250 may be a metal housing, a glass housing, a plastic housing, or a ceramic housing. In this embodiment of this application, a material of the housing 250 is not limited, and is not limited to the foregoing examples either.

It should be noted that, in some examples, the housing 250 of the mobile phone may be connected to the frame 222 to form a unibody housing. For example, the mobile phone may include the display screen 210, the metal middle plate 221, and a housing. The housing may be a unibody housing formed by the frame 222 and the housing 250. In this way, the circuit board 230 and the battery 240 are located in space enclosed by the metal middle plate 221 and the housing.

In a possible implementation, a second hole 251 may be further disposed on the housing 250 as a light-transmitting region of the rear-facing camera module 270. Similarly, the first hole 211 on the display screen 210 may also be used as a light-transmitting region of the front-facing camera module 260.

Figure 2A:
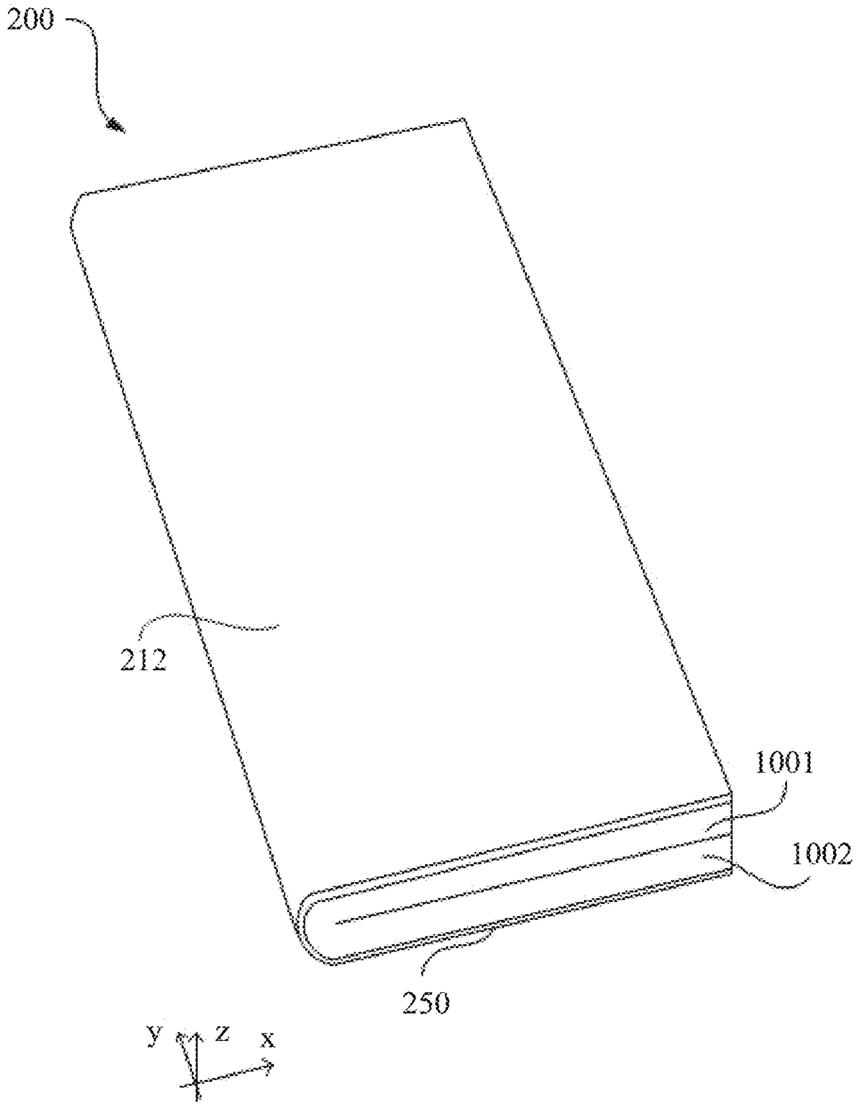
FIG. 2A is a schematic diagram of a three-dimensional structure of a foldable screen electronic device in a folded state according to an embodiment of this application.
Figure 2B:
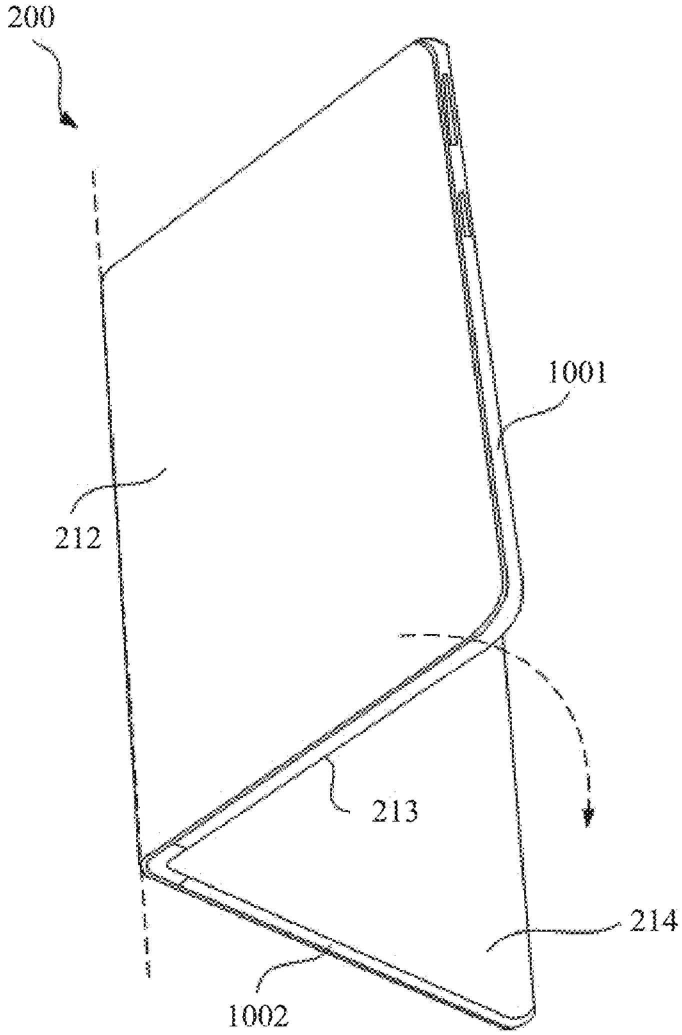
FIG. 2B is a schematic diagram of a three-dimensional structure of a foldable screen electronic device in a semi-folded state according to an embodiment of this application.
Figure 2C:
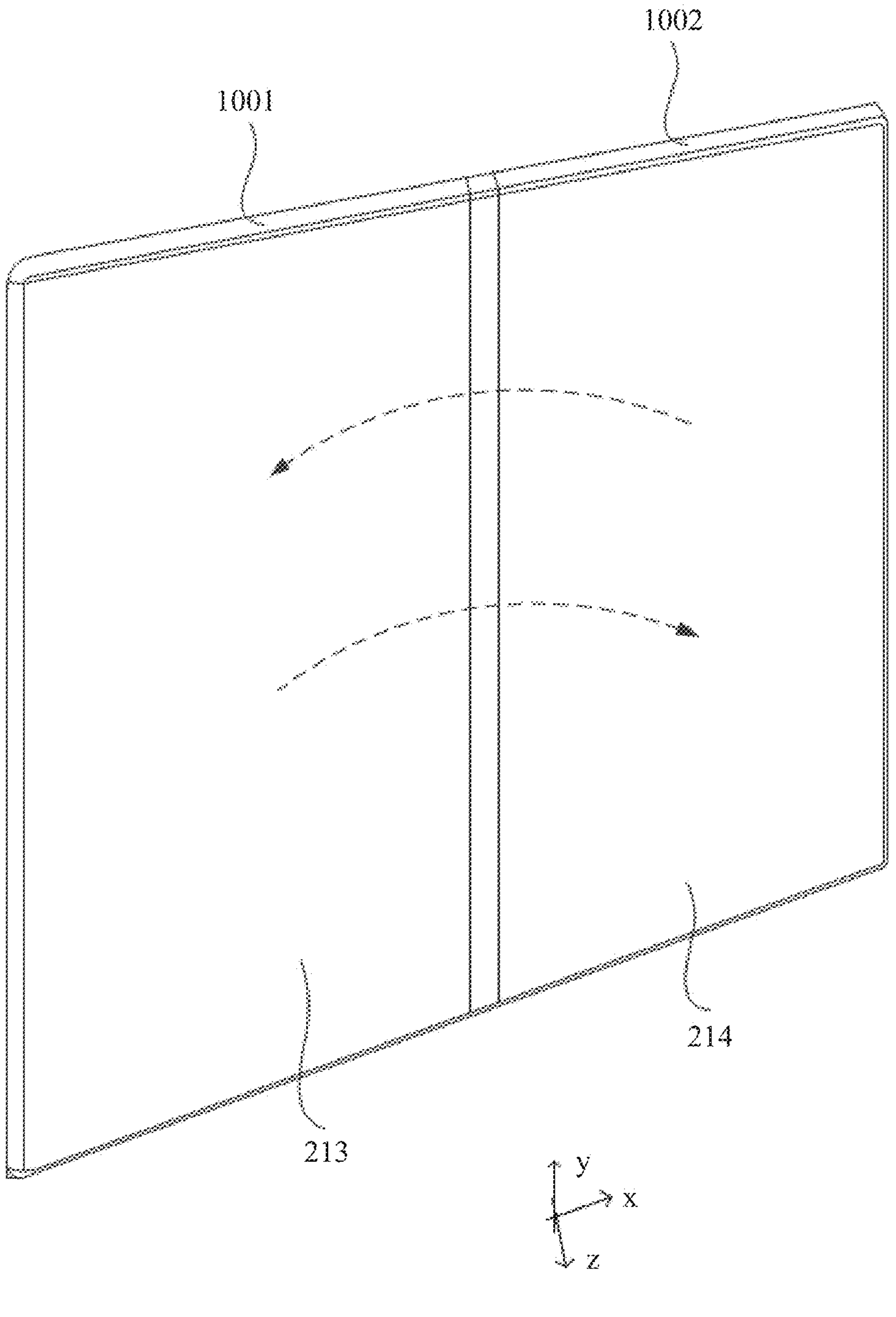
FIG. 2C is a schematic diagram of a three-dimensional structure of a foldable screen electronic device in an unfolded state according to an embodiment of this application.

In addition, in some embodiments, the electronic device 200 may further be a foldable screen electronic device. Referring to FIG. 2A to FIG. 2C, that the electronic device 200 is a foldable screen mobile phone is used as an example. In the foldable screen mobile phone, the display screen 210 may include an outer screen body 212, a first inner screen body 213, and a second inner screen body 214. The metal frame 100 may include a first metal frame 1001 and a second metal frame 1002. There is a bending region between the first metal frame 1001 and the second metal frame 1002. The first metal frame 1001 and the second metal frame 1002 implement folding and unfolding between the first metal frame 1001 and the second metal frame 1002 by using the bending region.

Figure 2D:
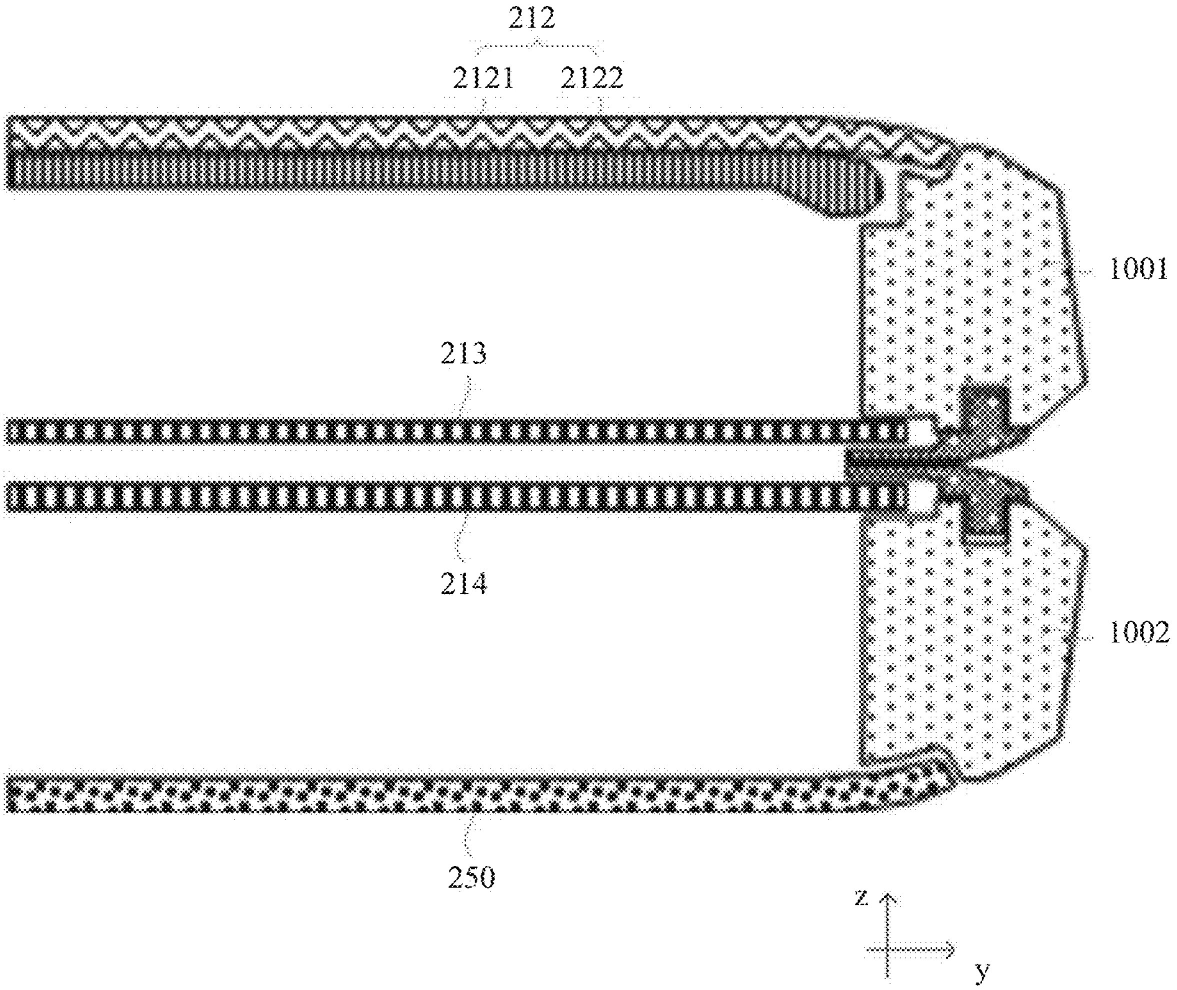
FIG. 2D is a schematic diagram of a cross section of a foldable screen electronic device according to an embodiment of this application.
Figure 2E:
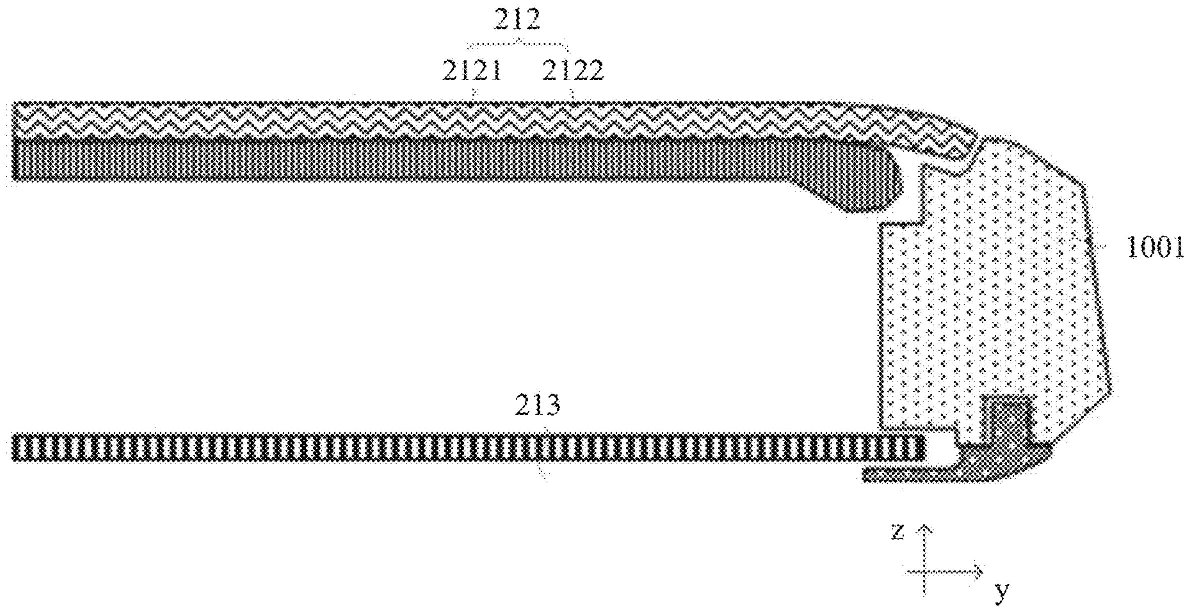
FIG. 2E is a schematic diagram of a partial cross section of a foldable screen electronic device according to an embodiment of this application.

As shown in FIG. 2D or FIG. 2E, the first inner screen body 213 and the second inner screen body 214 are located between the outer screen body 212 and the housing 250. In addition, one end of the first metal frame 1001 is connected to the outer screen body 212, the other end of the first metal frame 1001 is connected to the first inner screen body 213, one end of the second metal frame 1002 is connected to the second inner screen body 214, and the other end of the second metal frame 1002 is connected to the housing 250.

For example, when the first metal frame 1001 and the second metal frame 1002 rotate in a direction close to each other to a folded state (refer to FIG. 2A), the first inner screen body 213 and the second inner screen body 214 of the foldable screen mobile phone are also in a folded state and are between the first metal frame 1001 and the second metal frame 1002. When the first metal frame 1001 and the second metal frame 1002 rotate in a direction away from each other to an unfolded state (refer to FIG. 2B and FIG. 2C), until the first metal frame 1001 and the second metal frame 1002 are located on a same horizontal plane, the first inner screen body 213 and the second inner screen body 214 of the foldable screen mobile phone are also in an unfolded state and are located on a same horizontal plane.

In this embodiment of this application, as shown in FIG. 2A and FIG. 2C, that the electronic device 200 is in a flattened or folded state is used as an example. A width direction of the electronic device 200 is an x direction, a length direction of the electronic device 200 is ay direction, and a thickness direction of the electronic device 200 is a z direction. The length, the width, and the thickness in this embodiment of this application are merely for ease of description, and do not constitute any limitation on a size. For example, the length may be greater than, equal to, or less than the width.

It may be understood that the structure illustrated in this embodiment of this application does not constitute a specific limitation on the electronic device. In some other embodiments of the embodiments of this application, the electronic device may include more or fewer components than those shown in the figure, combine some components, split some components, or have different component arrangements. For example, the foldable screen mobile phone may further include components such as a camera module and a flash light. The components shown in the figure may be implemented by using hardware, software, or a combination of software and hardware.

In addition, referring to FIG. 2D or FIG. 2E, the outer screen body 212 may include at least a display module 2122 and a glass cover 2121. The glass cover 2121 may be located above the display module 2122. Specifically, the glass cover 2121 may cover the display module 2122, and a size of the glass cover 2121 may be greater than or equal to a size of the display module 2122.

It may be understood that the structure illustrated in this embodiment of this application does not constitute a specific limitation on the electronic device 200. In some other embodiments of this embodiment of this application, the electronic device 200 may include more or fewer components than those shown in the figure, combine some components, split some components, or have different component arrangements. The components shown in the figure may be implemented by using hardware, software, or a combination of software and hardware.

To implement a communication function of the electronic device, an antenna may be disposed on the electronic device, to transmit and receive signals by using the antenna. An antenna performance level of the electronic device in an actual use scenario is directly related to actual user experience. Currently, most electronic devices use an industry design (ID) of a metal frame and a glass housing.

An example in which the electronic device is a mobile phone is used. Generally, different antenna structures are designed at different spatial positions on the mobile phone. Specifically, different resonant antennas may be arranged at different positions in space in the mobile phone based on actual scenario requirements, to meet antenna requirements in different scenarios. In a related technology, when an antenna is disposed in the mobile phone, the antenna is mainly disposed on a housing or a middle frame of the mobile phone. For example, for an electronic device with an ID of a metal frame and a glass battery cover, in a conventional antenna design solution, a plurality of segments of antennas are generally formed by disposing a slit on the metal frame, a feed point is disposed on a circuit board of the mobile phone, and the feed point is electrically connected to the antenna, to implement feeding of the antenna. However, in the foregoing design solution, spatial interference easily occurs between the antenna, the slit between two adjacent antennas, and the feed point. Consequently, an adverse impact is caused on feeding of the antenna.

Based on this, an embodiment of this application provides a new electronic assembly and a new electronic device, to resolve the foregoing technical problem. In the electronic assembly, at least two antennas are formed on a metal frame of the electronic assembly, a circuit board and an electronic component are located on one side of the metal frame, and there is a gap **100*b* between the metal frame and each of the circuit board and the electronic component. An orthographic projection of the electronic component on the metal frame covers a first antenna, a slit between the first antenna and a second antenna, and a part of the second antenna, and an orthographic projection of the circuit board on the metal frame covers a part of the second antenna. One end of a first extension member is connected to an end that is of the first antenna and that is close to the second antenna, the other end of the first extension member extends into the gap 100*b***, and is electrically connected to a first feed point on the circuit board. The second antenna is electrically connected to a second feed point on the circuit board. In this way, spatial interference between an antenna, a slit between two adjacent antennas, and a feed point can be avoided, so that an adverse impact on feeding of the first antenna and the second antenna can be avoided, and a use effect of a user can be ensured.

It should be noted that the electronic device provided in this application is suitable for using any one or more of the following communication technologies, for example, a long term evolution (LTE) communication technology, a Wi-Fi communication technology, a 5G communication technology, a SUB-6G communication technology, a multiple-input multiple-output (MIMO) communication technology, and another communication technology in the future. The MIMO communication technology is an antenna system that uses a plurality of antennas at both a transmit end and a receive end to form a plurality of channels between the transmit end and the receive end, and has extremely high spectrum utilization efficiency.

With reference to specific accompanying drawings, the following describes in detail specific structures of the electronic assembly and the electronic device that has the electronic assembly (in the following embodiments, a requirement of a communication network is not highlighted, and a working characteristic of an antenna in the electronic device is described only by using a magnitude of frequency).

Figure 3:
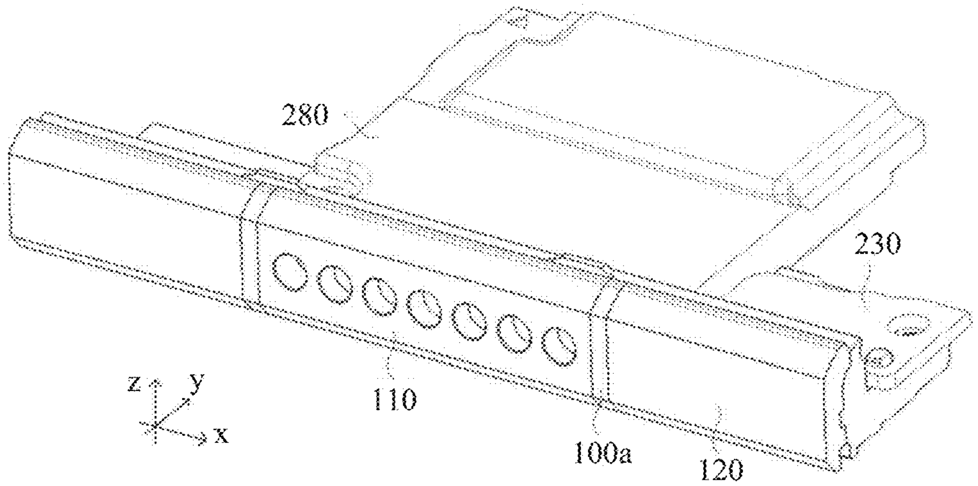
FIG. 3 is a schematic diagram of a partial structure of an electronic device according to an embodiment of this application.
Figure 4:
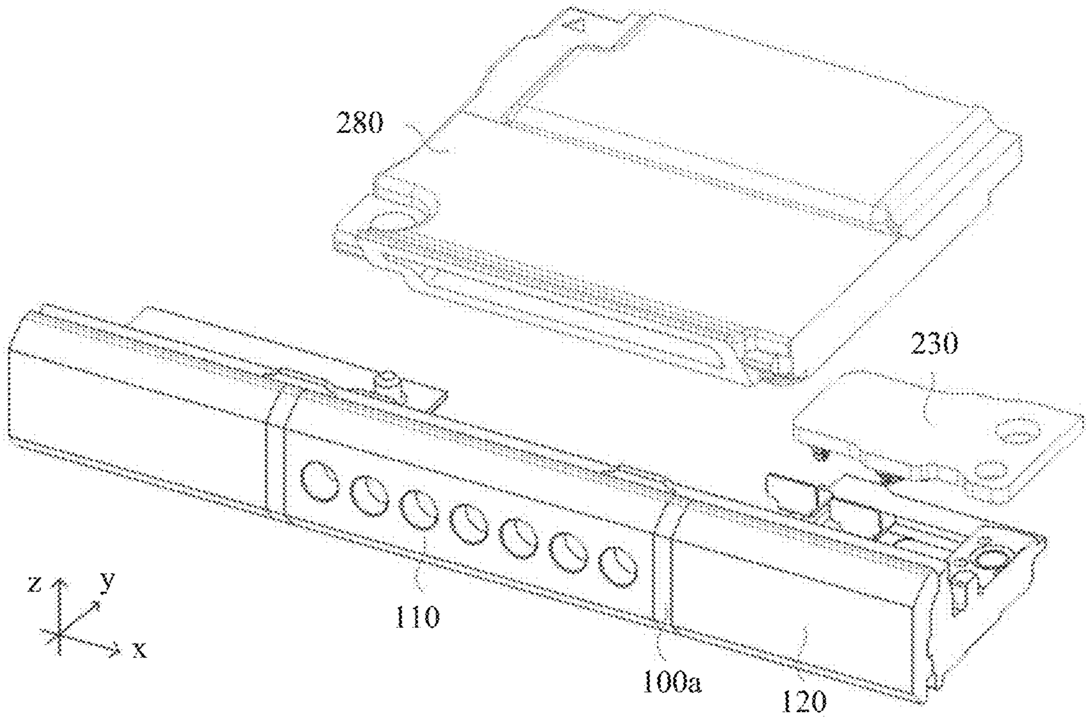
FIG. 4 is a schematic diagram of a partial structure of an electronic device according to an embodiment of this application.
Figure 5:
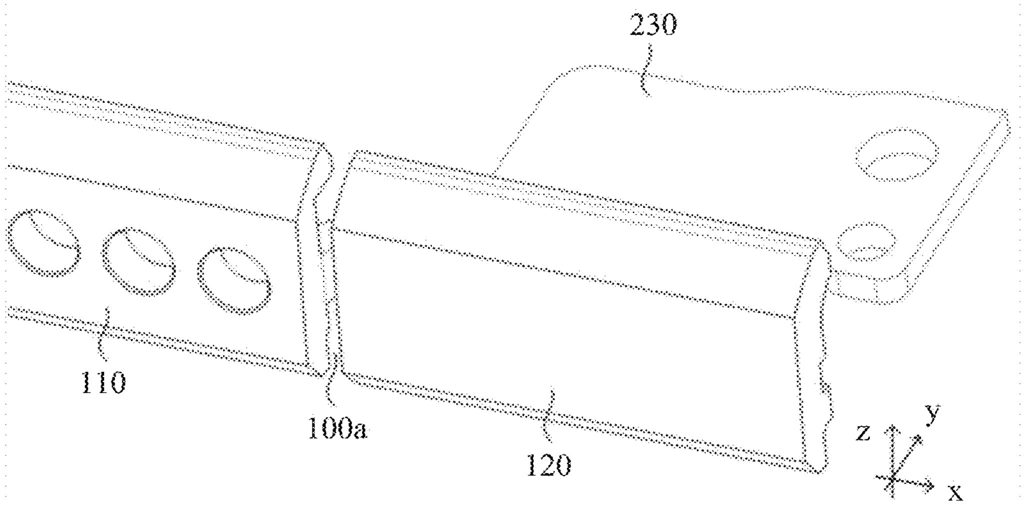
FIG. 5 is a schematic diagram of a partial structure of an electronic device according to an embodiment of this application.

An embodiment of this application provides an electronic device 200. Specifically, the electronic device 200 may include at least a display screen 210, a housing 250, and an electronic assembly. The display screen 210 and the housing 250 are respectively located on two sides of the electronic assembly. Specifically, referring to FIG. 3 and FIG. 4, the electronic assembly may include at least a circuit board 230, an electronic component 280, and a metal frame 100. At least one slit 100*a* is disposed on the metal frame 100, so that at least two antennas (for example, a first antenna 110 and a second antenna 120 in FIG. 5) are formed on the metal frame 100.

In other words, the antenna is a slot antenna formed after the slit 100*a* is disposed on the metal frame 100. For example, the slot antenna may include a first part, a second part, and a third part that are separated by the slit 100*a*, and a non-conductive material may be filled between the first part and the second part, between the second part and the third part, and between the third part and the first part.

In actual application, a position of the slit 100*a* may be varied as required, and each slit 100*a* may be filled with a non-conductive material (such as plastic), to ensure integrity of the metal frame 100 in appearance. A disposition position of the slit 100*a* on the metal frame 100 is flexibly provided, so that appearance design with different requirements can be implemented while ensuring antenna radiation performance, to help improve product quality of the electronic device 200.

Figure 6:
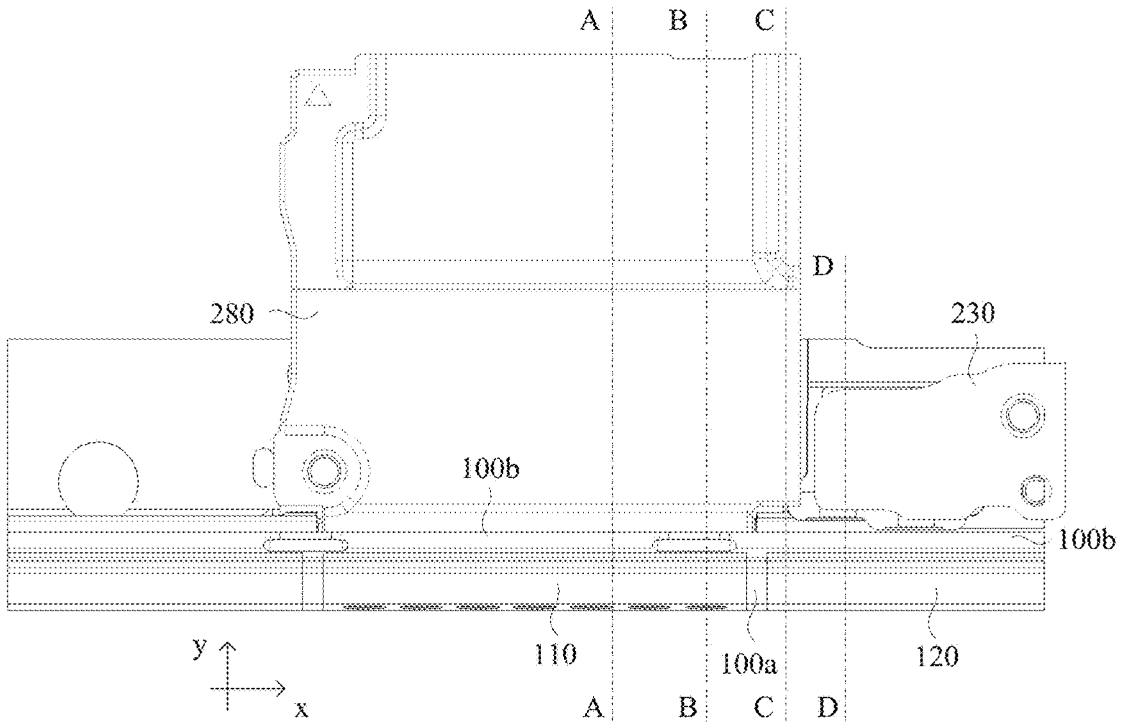
FIG. 6 is a schematic diagram of a partial structure of an electronic device according to an embodiment of this application.

In addition, as shown in FIG. 6, the circuit board 230 and the electronic component 280 are located on one side of the metal frame 100, and there is a gap 100*b* between the metal frame 100 and each of the circuit board 230 and the electronic component 280.

Still referring to FIG. 6, the at least two antennas may include at least a first antenna 110 and a second antenna 120. An orthographic projection of the electronic component 280 on the metal frame 100 may cover the first antenna 110, the slit 100*a* between the first antenna 110 and the second antenna 120, and a part of the second antenna 120, and an orthographic projection of the circuit board 230 on the metal frame 100 may cover a part of the second antenna 120.

Figure 7:
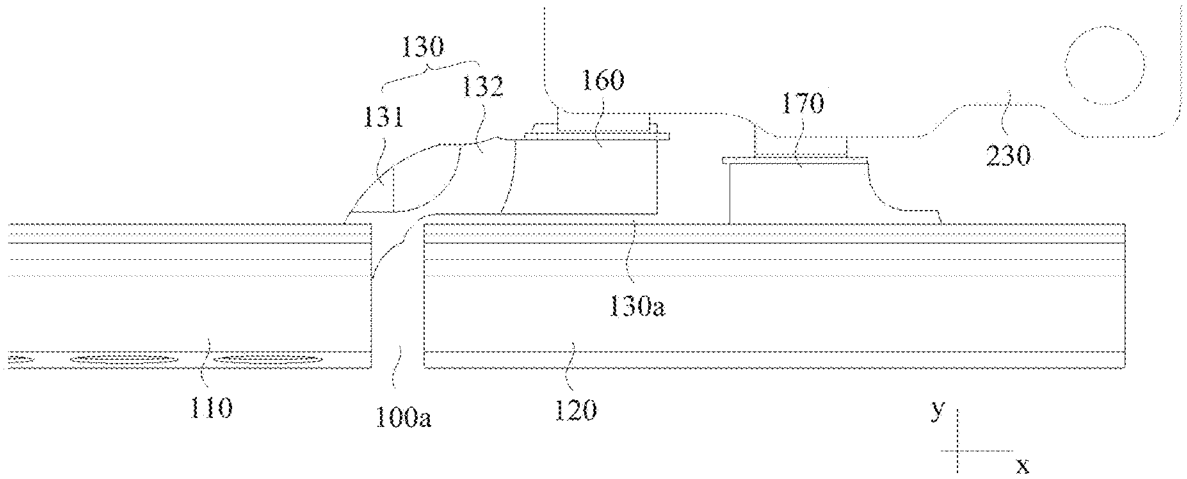
FIG. 7 is a schematic diagram of a partial structure of an electronic device according to an embodiment of this application.

In this embodiment of this application, referring to FIG. 7, the electronic assembly may further include a first extension member 130. One end of the first extension member 130 is connected to an end that is of the first antenna 110 and that is close to the second antenna 120, and the other end of the first extension member 130 extends into the gap 100*b* between the metal frame 100 and each of the circuit board 230 and the electronic component 280. In addition, the other end of the first extension member 130 is electrically connected to a first feed point (not shown in the figure) on the circuit board 230, and the second antenna 120 is electrically connected to a second feed point (not shown in the figure) on the circuit board 230.

In the electronic assembly, at least one slit 100*a* is disposed on the metal frame 100, so that at least two antennas are formed on the metal frame 100. Two antennas are used as an example. The orthographic projection of the electronic component 280 on the metal frame 100 covers the first antenna 110, the slit 100*a* between the first antenna 110 and the second antenna 120, and a part of the second antenna 120. The orthographic projection of the circuit board 230 on the metal frame 100 covers a part of the second antenna 120.

In this case, the second antenna 120 is opposite to the circuit board 230, and the second antenna 120 is electrically connected to the second feed point on the circuit board 230. The first extension member 130 is disposed. One end of the first extension member 130 is connected to the end that is of the first antenna 110 and that is close to the second antenna 120, and the other end of the first extension member 130 extends into the gap 100*b*, and is electrically connected to the first feed point on the circuit board 230. In this way, spatial interference between the first antenna 110, the second antenna 120, the slit 100*a* between the first antenna 110 and the second antenna 120, and the first feed point and the second feed point on the circuit board 230 can be avoided, so that an adverse impact on feeding of the first antenna 110 and the second antenna 120 can be avoided.

It may be understood that, in this embodiment of this application, the first feed point and the second feed point each may be a metal elastic piece, a probe, a conductive cable, or the like. In this way, the first antenna 110 and the second antenna 120 may be separately fed by using the metal elastic piece, the probe, the conductive cable, or the like. It should be noted that specific forming manners of the first feed point and the second feed point are not limited in this embodiment of this application, and are not limited to the foregoing example, provided that a feeding connection can be implemented.

In addition, in this embodiment of this application, a quantity of first feed points corresponding to the first antenna 110 may be one, two, three, or more. That is, the first antenna 110 may be fed by using one first feed point, or the first antenna 110 may be fed by using two first feed points at the same time, or the first antenna 110 may be fed by using three first feed points at the same time, or the first antenna 110 may be fed by using more first feed points at the same time. This is not limited in this embodiment of this application.

Similarly, a quantity of second feed points corresponding to the second antenna 120 may be one, two, three, or more. That is, the second antenna 120 may be fed by using one second feed point, or the second antenna 120 may be fed by using two second feed points at the same time, or the second antenna 120 may be fed by using three second feed points at the same time, or the second antenna 120 may be fed by using more second feed points at the same time. This is not limited in this embodiment of this application.

In addition, it may be understood that, in some embodiments, disposition positions of the first feed point and the second feed point on the circuit board 230 should not interfere with each other. For example, the first feed point and the second feed point may be arranged sequentially along an outer edge of the circuit board 230.

In this embodiment of this application, there may be a distance 130*a* (refer to FIG. 7) between the first extension member 130 and a surface that is of the second antenna 120 and that faces the electronic component 280.

There is a distance 130*a* between the first extension member 130 and the surface that is of a second metal frame 100 and that faces the electronic component 280, so that position interference between the second metal frame 100 and the first extension member 130 can be avoided. Because a feeding connection between the first antenna 110 and the first feed point on the circuit board 230 is implemented by using the first extension member 130, an adverse impact on the feeding connection between the first antenna 110 and the first feed point on the circuit board 230 can be avoided.

In a possible implementation, the distance 130*a* between the first extension member 130 and the surface that is of the second antenna 120 and that faces the electronic component 280 may be 0.1 mm-2 mm. For example, the distance 130*a* between the first extension member 130 and the surface that is of the second antenna 120 and that faces the electronic component 280 may be 0.1 mm, 0.5 mm, 1 mm, 1.5 mm, 2 mm, or the like. This is not limited in this embodiment of this application.

It should be noted herein that a value and a value range in this application are approximate values, and an error in a specific range may exist due to an impact of a manufacturing process. A person skilled in the art may ignore the error.

Figure 8:
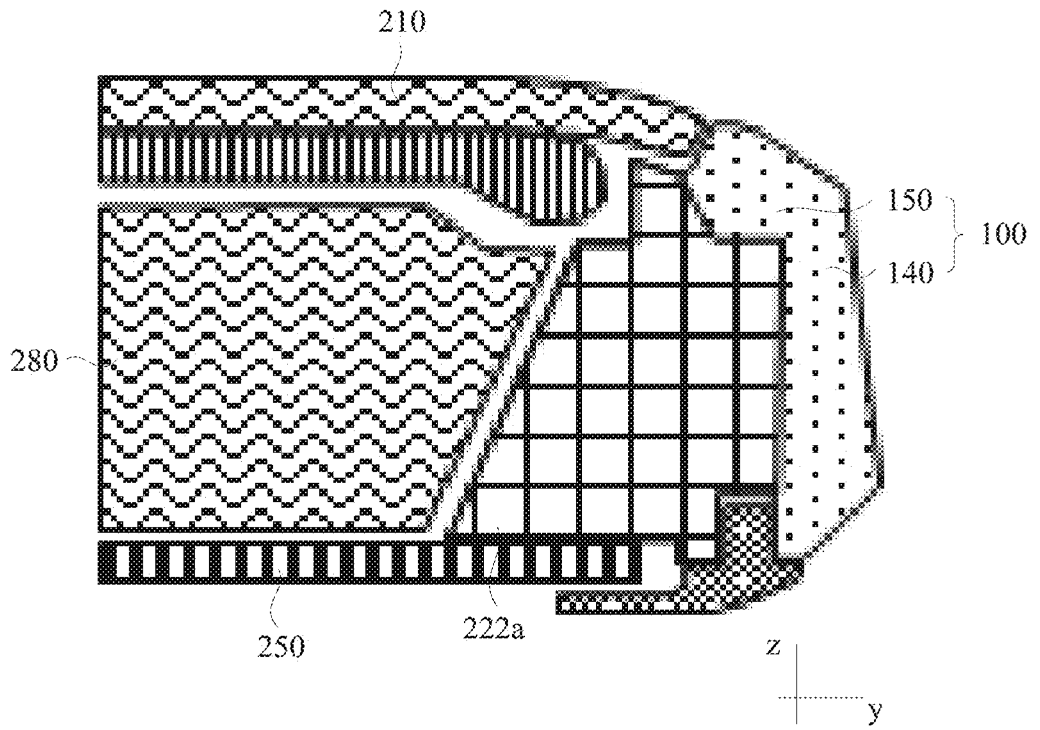
FIG. 8 is a sectional view of A-A in FIG. 6.
Figure 9:
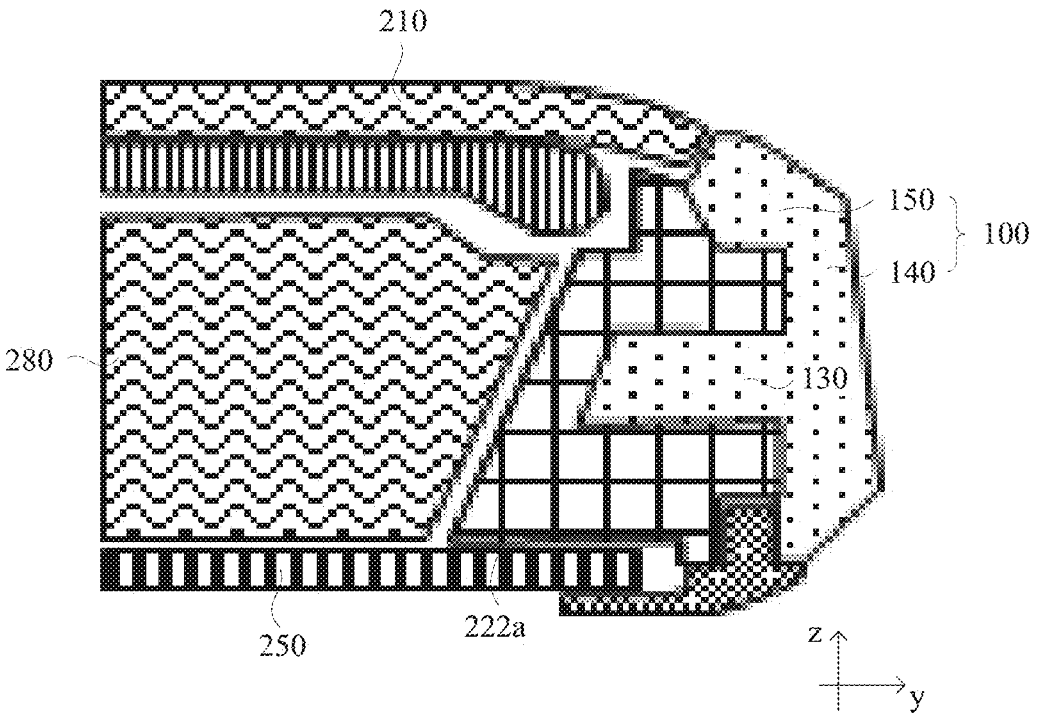
FIG. 9 is a sectional view of B-B in FIG. 6.
Figure 10:
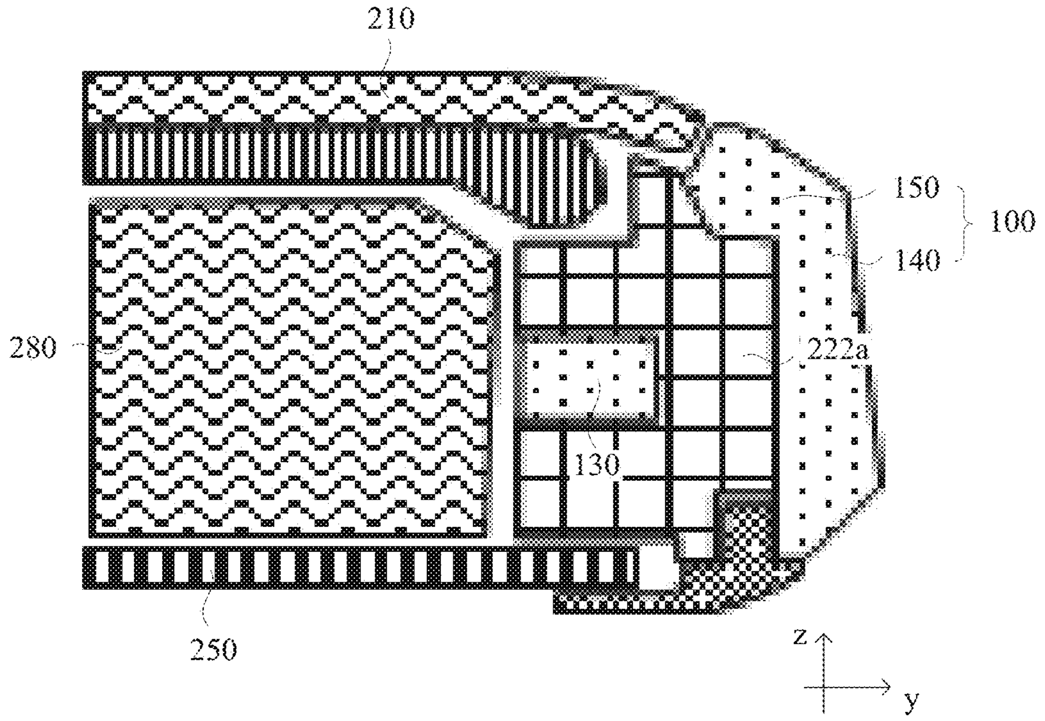
FIG. 10 is a sectional view of C-C in FIG. 6.
Figure 11:
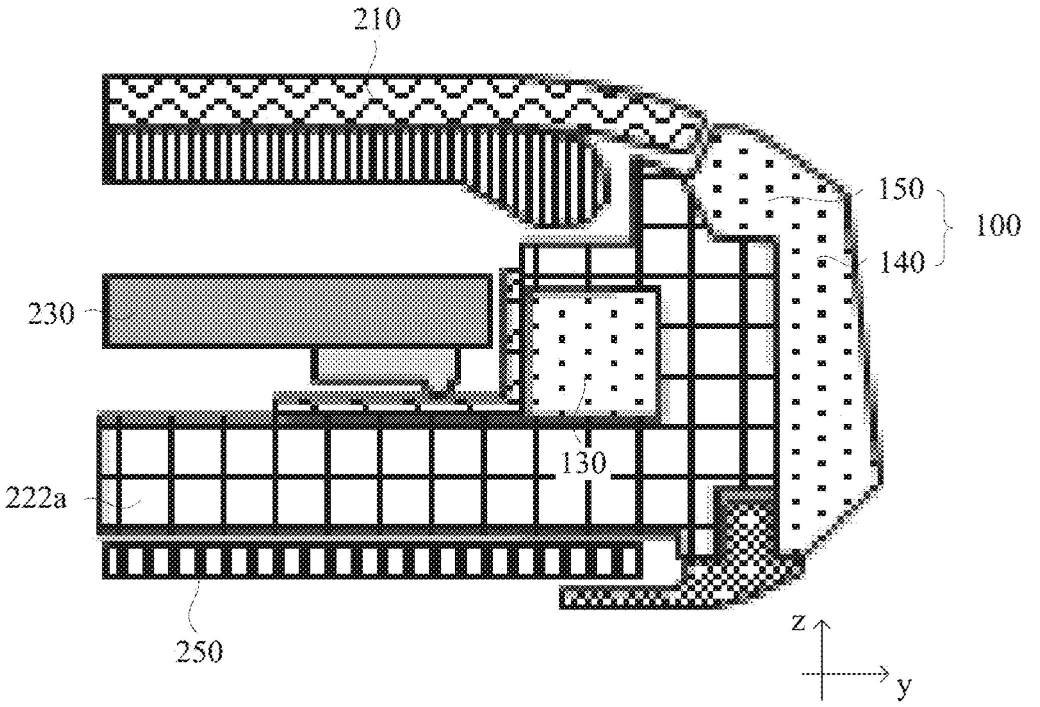
FIG. 11 is a sectional view of D-D in FIG. 6.

It should be noted that, in this embodiment of this application, FIG. 8 is a sectional view of A-A in FIG. 6, FIG. 9 is a sectional view of B-B in FIG. 6, FIG. 10 is a sectional view of C-C in FIG. 6, and FIG. 11 is a sectional view of D-D in FIG. 6. It may be learned from FIG. 8 to FIG. 11 that, B-B is a connection position between the first extension member 130 and the first antenna 110, and at C-C and D-D, there is a distance 130*a* between the first extension member 130 and the second antenna 120.

In addition, referring to FIG. 7, in this embodiment of this application, the metal frame 100 may include a first part 140 and a second part 150. One end of the second part 150 is connected to the first part 140, and the other end of the second part 150 is bent toward the electronic component 280.

Figure 12:
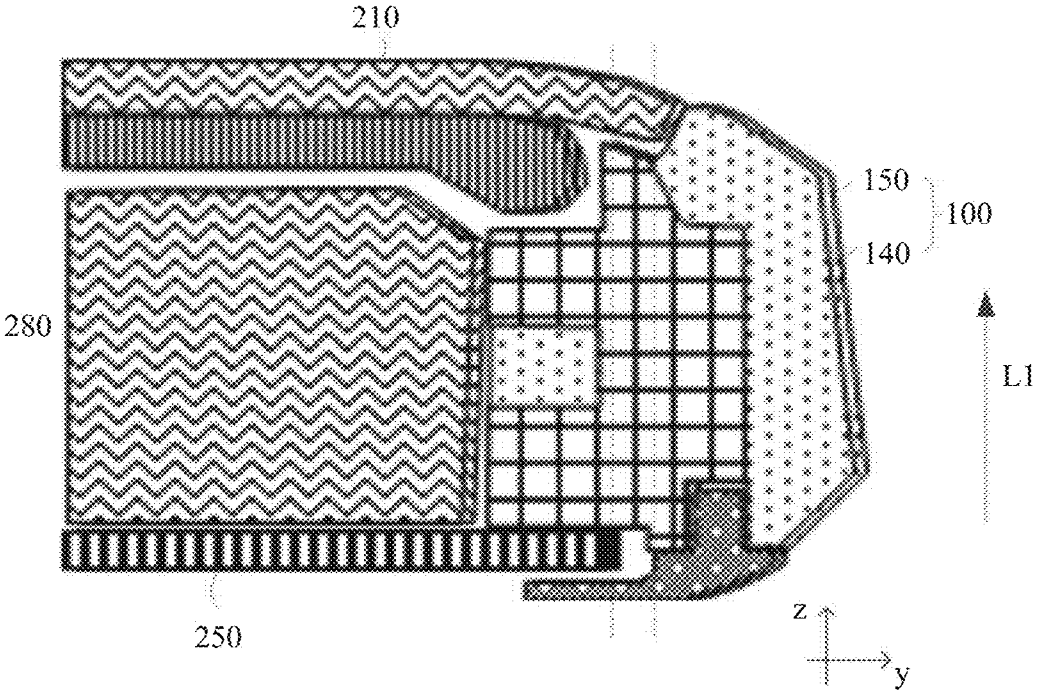
FIG. 12 is a sectional view of C-C in FIG. 6.
Figure 13:
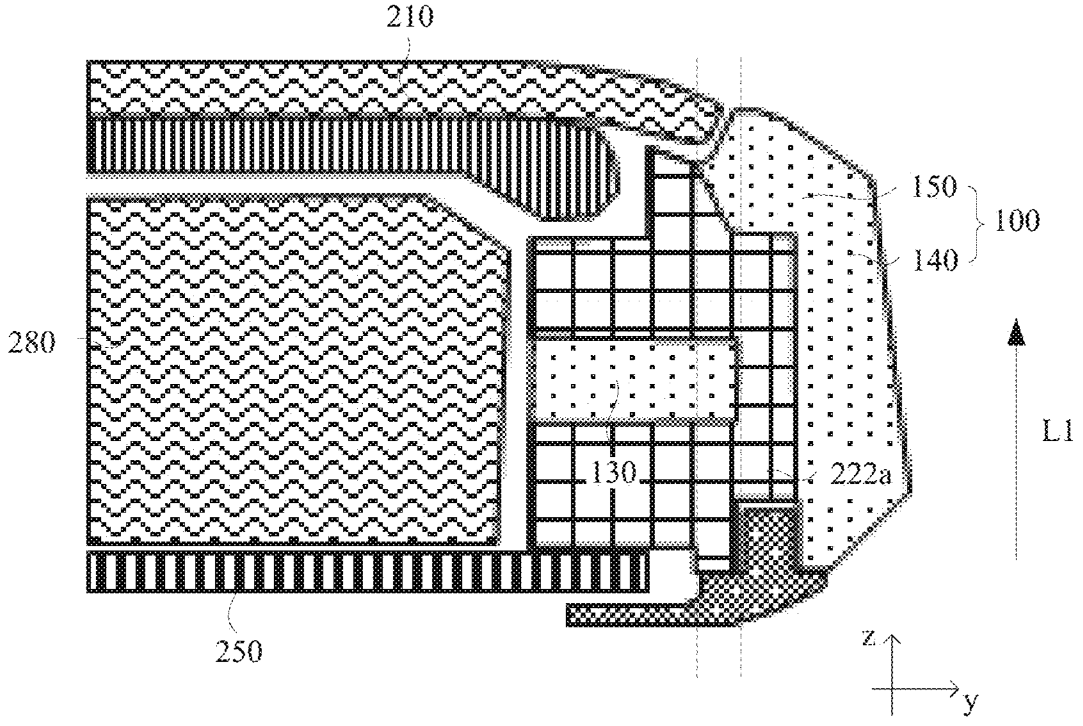
FIG. 13 is another sectional view of C-C in FIG. 6.

In addition, the second part 150 and the first extension member 130 may be staggered from each other in a first direction L1 (refer to FIG. 12), or the second part 150 may at least partially overlap the first extension member 130 in a first direction L1 (refer to FIG. 13). The first direction L1 may be a thickness direction of the electronic device 200.

The metal frame 100 includes the first part 140 and the second part 150. The second part 150 of the metal frame 100 and the first extension member 130 are staggered from each other in the thickness direction of the electronic device 200, or the second part 150 of the metal frame 100 at least partially overlaps the first extension member 130 in the thickness direction of the electronic device 200. Therefore, it can be ensured that position interference between the second metal frame 100 and the first extension member 130 is avoided, so that an adverse impact on the feeding connection between the first antenna 110 and the first feed point on the circuit board 230 can be avoided.

As shown in FIG. 7, in this embodiment of this application, the first extension member 130 may include a first extension part 131 and a second extension part 132 connected to the first extension part 131. One end of the first extension part 131 is connected to the first antenna 110, the other end of the first extension part 131 crosses over the slit 100*a* between the first antenna 110 and the second antenna 120, and is connected to one end of the second extension part 132, and the other end of the second extension part 132 is electrically connected to the first feed point.

The first extension member 130 is designed to include the first extension part 131 and the second extension part 132. One end of the first extension part 131 is connected to the first antenna 110, the other end of the first extension part 131 is connected to one end of the second extension part 132, and the other end of the second extension part 132 is electrically connected to the first feed point on the circuit board 230. In this way, the feeding connection between the first antenna 110 and the first feed point on the circuit board 230 can be implemented, so that the first feed point on the circuit board 230 can feed the first antenna 110 well.

In a possible implementation, a projection of the first extension part 131 in a direction perpendicular to the first direction L1 is located on the first antenna 110 and within the slit 100*a* between the first antenna 110 and the second antenna 120; and a projection of the second extension part 132 in the direction perpendicular to the first direction L1 is located on the second antenna 120. In this way, the first extension part 131 and the second extension part 132 do not stack in the first direction L1 (namely, the thickness direction of the electronic device 200). This does not increase a thickness of the electronic device 200, thereby saving space in the electronic device 200.

It should be noted that, in this embodiment of this application, the first direction L1 (namely, the thickness direction of the electronic device 200) is the z direction, and the direction perpendicular to the first direction L1 is the x direction or the y direction.

Figure 14:
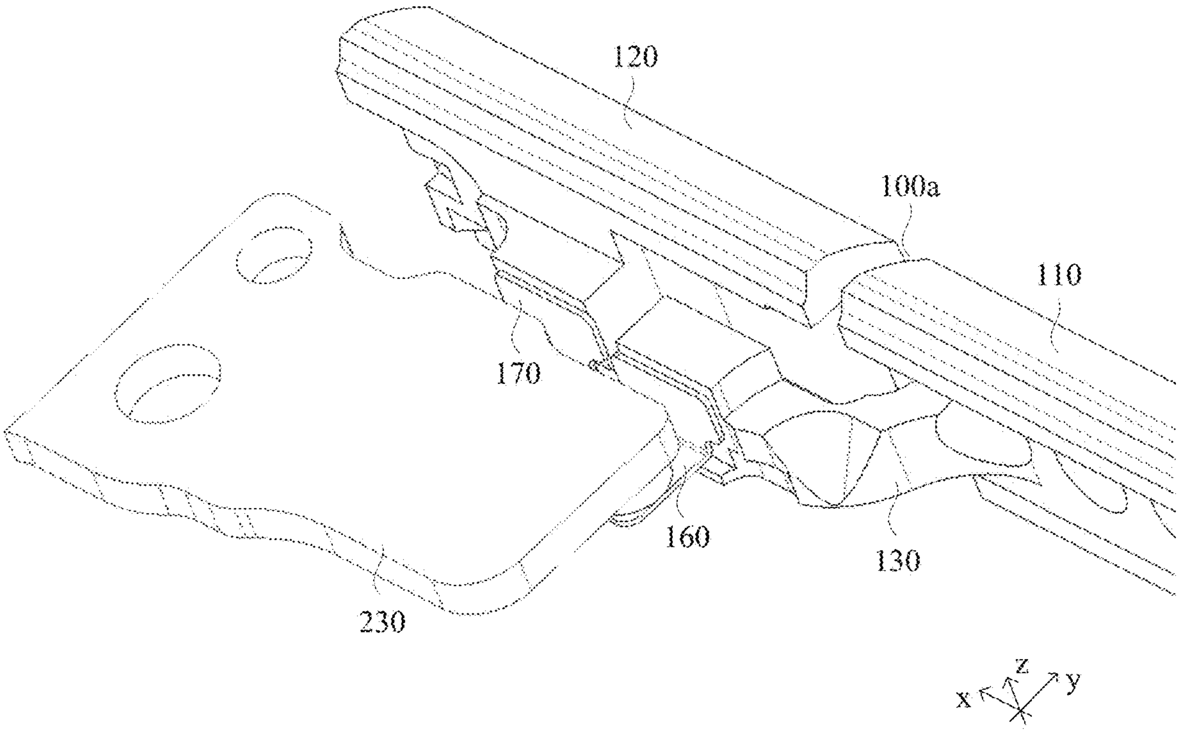
FIG. 14 is a schematic diagram of a partial structure of an electronic device according to an embodiment of this application.
Figure 15:
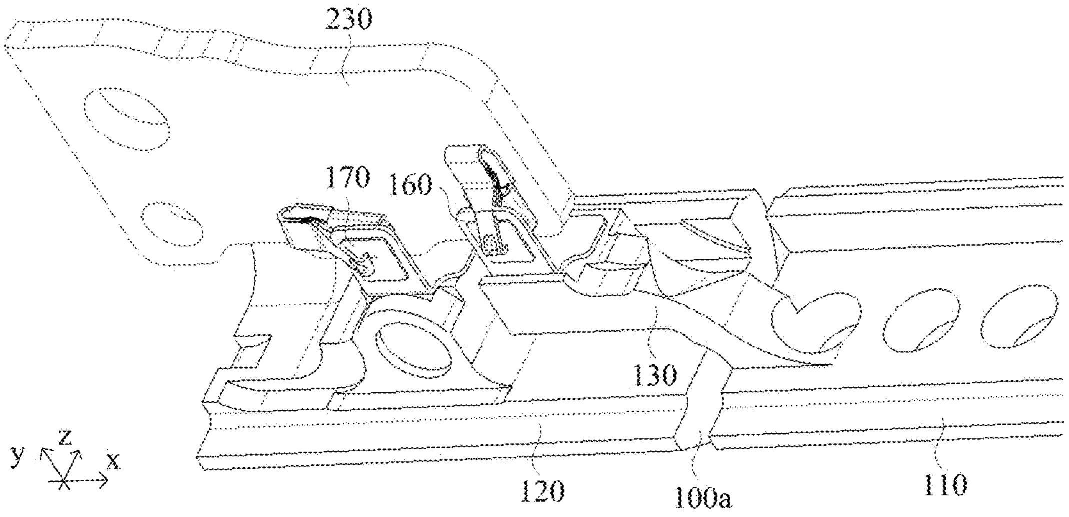
FIG. 15 is a schematic diagram of a partial structure of an electronic device according to an embodiment of this application.
Figure 16:
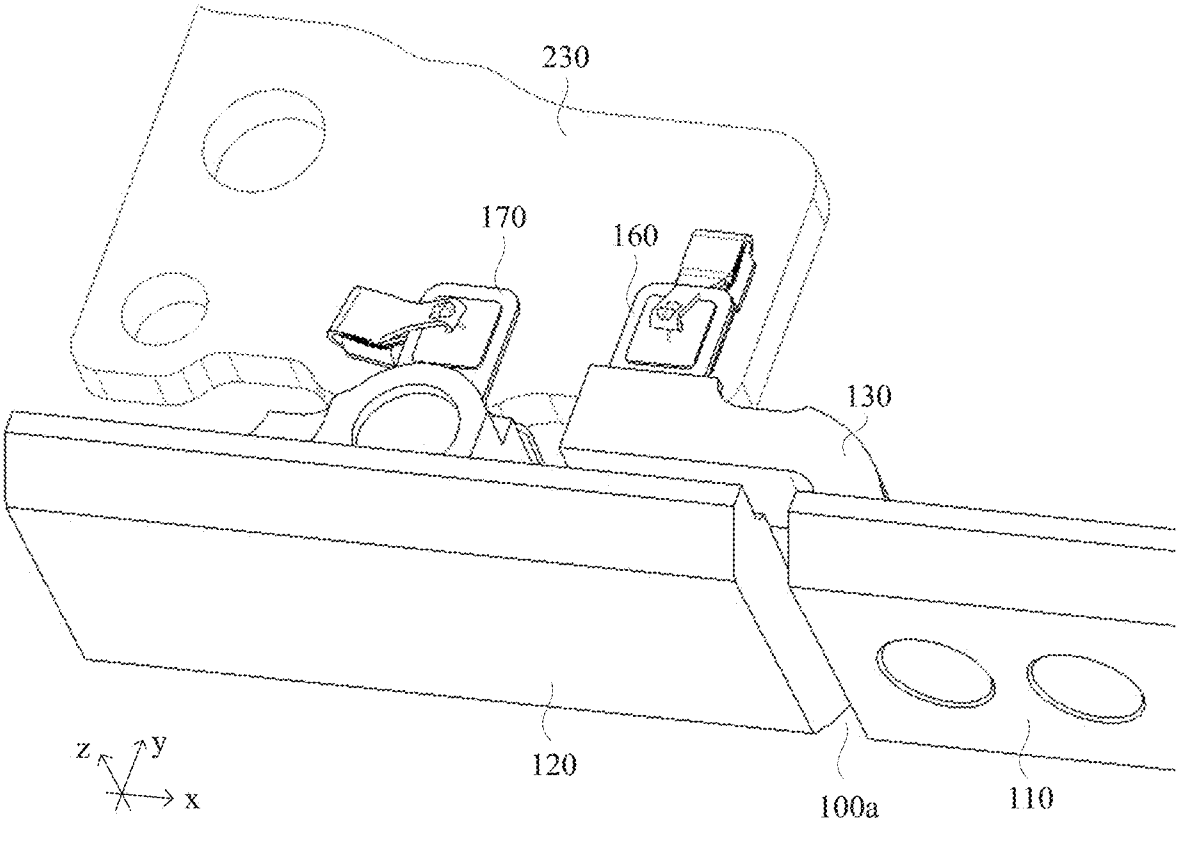
FIG. 16 is a schematic diagram of a partial structure of an electronic device according to an embodiment of this application.

In some embodiments, as shown in FIG. 14 to FIG. 16, the electronic assembly may further include a first electrical connection member 160. The first extension member 130 may be electrically connected to the first feed point by using the first electrical connection member 160. Specifically, one end of the first electrical connection member 160 is connected to the first extension member 130, and the other end of the first electrical connection member 160 is electrically connected to the first feed point on the circuit board 230. Therefore, an electrical connection between the first extension member 130 and the first feed point on the circuit board 230 can be implemented, and an electrical connection between the first antenna 110 and the first feed point on the circuit board 230 can be implemented, so that the first feed point on the circuit board 230 can feed the first antenna 110 well.

Similarly, in some embodiments, as shown in FIG. 15 and FIG. 16, the electronic assembly may further include a second electrical connection member 170. The second antenna 120 may be electrically connected to the second feed point by using the second electrical connection member 170. Specifically, one end of the second electrical connection member 170 is connected to the second antenna 120, and the other end of the second electrical connection member 170 is electrically connected to the second feed point on the circuit board 230. Therefore, an electrical connection between the second antenna 120 and the second feed point on the circuit board 230 can be implemented, so that the second feed point on the circuit board 230 can feed the second antenna 120 well.

In addition, based on the foregoing embodiment, the at least two antennas may further include a third antenna (not shown in the figure), and the electronic assembly may further include a second extension member (not shown in the figure). Specifically, a disposition manner of the third antenna and a connection manner of the second extension member may include but are not limited to the following two possible implementations:

A possible implementation is as follows: The second antenna 120 is located between the first antenna 110 and the third antenna, one end of the second extension member may be connected to an end that is of the third antenna and that faces the second antenna 120, the other end of the second extension member may extend into the gap 100*b* between the third antenna and the second antenna 120, and the other end of the second extension member may be electrically connected to a third feed point (not shown in the figure) on the circuit board 230.

The second antenna 120 is located between the first antenna 110 and the third antenna. The second extension member is disposed, one end of the second extension member is connected to the end that is of the third antenna and that faces the second antenna 120, and the other end of the second extension member extends into the gap 100*b* between the third antenna and the second antenna 120, and is electrically connected to the third feed point on the circuit board 230. In this way, the third antenna is electrically connected to the third feed point on the circuit board 230 by using the second extension member, and a feeding connection between the third antenna and the third feed point on the circuit board 230 can be implemented, so that the third feed point on the circuit board 230 can feed the third antenna well.

A possible implementation is as follows: The first antenna 110 is located between the second antenna 120 and the third antenna, one end of the second extension member may be connected to an end that is of the third antenna and that faces the first antenna 110, the other end of the second extension member may extend into the gap 100*b* between the third antenna and the first antenna 110, and the other end of the second extension member may be electrically connected to a third feed point on the circuit board 230.

The first antenna 110 is located between the second antenna 120 and the third antenna. The second extension member is disposed, one end of the second extension member is connected to the end that is of the third antenna and that faces the first antenna 110, and the other end of the second extension member extends into the gap 100*b* between the third antenna and the first antenna 110, and is electrically connected to the third feed point on the circuit board 230. In this way, the third antenna is electrically connected to the third feed point on the circuit board 230 by using the second extension member, and a feeding connection between the third antenna and the third feed point on the circuit board 230 can be implemented, so that the third feed point on the circuit board 230 can feed the third antenna well.

In this case, in this embodiment of this application, the electronic assembly may further include a third electrical connection member (not shown in the figure). The second extension member is electrically connected to the second feed point by using the third electrical connection member. Specifically, one end of the third electrical connection member may be connected to the second extension member, and the other end of the third electrical connection member may be electrically connected to the third feed point on the circuit board 230. In this way, an electrical connection between the second extension member and the third feed point on the circuit board 230 can be implemented, and an electrical connection between the third antenna and the third feed point on the circuit board 230 can be implemented, so that the third feed point on the circuit board 230 can feed the third antenna well.

It may be understood that, in this embodiment of this application, the third feed point may be a metal elastic piece, a probe, a conductive cable, or the like. In this way, the third antenna may be fed by using the metal elastic piece, the probe, the conductive cable, or the like. It should be noted that a specific forming manner of the third feed point is not limited in this embodiment of this application, and is not limited to the foregoing example, provided that a feeding connection can be implemented.

In addition, in this embodiment of this application, a quantity of third feed points corresponding to the third antenna may be one, two, three, or more. That is, the third antenna may be fed by using one third feed point, or the third antenna may be fed by using two third feed points at the same time, or the third antenna may be fed by using three third feed points at the same time, or the third antenna may be fed by using more third feed points at the same time. This is not limited in this embodiment of this application.

In addition, it may be understood that, in some embodiments, disposition positions of the first feed point, the second feed point, and the third feed point on the circuit board 230 should not interfere with each other. For example, the first feed point, the second feed point, and the third feed point may be arranged sequentially along an outer edge of the circuit board 230.

It may be understood that, in this embodiment of this application, there may be more antennas in the electronic assembly. For example, the at least two antennas may further include a fourth antenna, a fifth antenna, a sixth antenna, and the like. In the electronic device 200 provided in this embodiment of this application, a quantity of antennas is increased, so that the antenna in the electronic device 200 can cover more antenna patterns.

In addition, it should be noted that the antenna may be a diversity antenna (Div Antenna), a Wi-Fi antenna, a Bluetooth antenna, a GPS antenna, a main antenna (Main Antenna), a multiple-input multiple-output (MIMO) antenna in medium-high band, or the like.

As shown in FIG. 8, in this embodiment of this application, the electronic device 200 may further include a plastic frame 222*a*. The plastic frame 222*a* is connected to the metal frame 100 to jointly form the frame 222, and the plastic frame 222*a* may be located on one side that is of the metal frame 100 and that faces the electronic component 280.

For example, the plastic frame 222*a* and the metal frame 100 may be connected to each other by using a nano molding technology (NMT). Generally, in NMT, micropores are made by using a treatment agent on a metal surface, and then injection molding is performed, so that plastic can enter the micropores. Alternatively, in addition to the micropore processing, a physical hole such as a through hole with a diameter of about 0.8 mm may be disposed on the metal, so that the plastic can run through the hole to implement physical adhesive bonding. Certainly, in some other embodiments, the plastic frame 222*a* may be connected to the metal frame 100 in another manner or the like. This is not limited in this embodiment of this application.

In addition, it should be noted that, in this embodiment of this application, the electronic component 280 may be any component such as a speaker, a camera, a motor, or a subscriber identity module (SIM). This is not limited in this embodiment of this application.

In the descriptions of the embodiments of this application, it should be noted that, unless otherwise explicitly specified and defined, the terms "mount", "communicate", and "connect" should be understood in a broadest sense, for example, may be a fixed connection, an indirect connection by using an intermediate medium, or a connection between insides of two elements or an interaction relationship between the two elements. A person of ordinary skill in the art may understand specific meanings of the foregoing terms in the embodiments of this application based on a specific situation.

The apparatus or element referred to or implied in the embodiments of this application needs to have a specific orientation, be constructed and operated in a specific orientation, and therefore cannot be construed as a limitation on the embodiments of this specification. In the descriptions of the embodiments of this application, "a plurality of" means two or more, unless otherwise specifically specified.

The terms "first", "second", "third", "fourth", and the like (if existent) in the specification, claims, and accompanying drawings of the embodiments of this application are used to distinguish between similar objects, but are not necessarily used to describe a particular order or sequence. It should be understood that data used in such a way is interchangeable in proper situations, so that the embodiments of this application described herein can be implemented, for example, in orders other than those illustrated or described herein. In addition, the terms "may include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

Finally, it should be noted that the foregoing embodiments are merely used to describe but not limit the technical solutions of the embodiments of this application. Although the embodiments of this application are described in detail with reference to the foregoing embodiments, it should be understood by a person of ordinary skill in the art that the technical solutions described in the foregoing embodiments may still be modified, or some or all technical features thereof may be equivalently replaced. These modifications or replacements do not make the essence of the corresponding technical solutions depart from the scope of the technical solutions of the embodiments of this application.

The invention claimed is:

1. An electronic assembly, comprising:
- a first extension member;
- a circuit board;
- an electronic component; and
- a metal frame, wherein
- at least one slit is disposed on the metal frame, so that at least two antennas are formed on the metal frame;
- wherein the circuit board and the electronic component are located on one side of the metal frame, and there is a gap between the metal frame and each of the circuit board and the electronic component;
- wherein the at least two antennas comprise a first antenna and a second antenna, an orthographic projection of the electronic component on the metal frame covers the first antenna, the at least one slit between the first antenna and the second antenna, and a part of the second antenna, and an orthographic projection of the circuit board on the metal frame covers a part of the second antenna;
- wherein one end of the first extension member is connected to an end that is of the first antenna and that is closer to the second antenna, and another end of the first extension member extends into the gap, and is electrically connected to a first feed point on the circuit board; and
- wherein the second antenna is electrically connected to a second feed point on the circuit board.

2. The electronic assembly according to claim 1, wherein there is a distance between the first extension member and a surface that is of the second antenna and that faces the electronic component.

3. The electronic assembly according to claim 2, wherein the distance between the first extension member and the surface that is of the second antenna and that faces the electronic component is 0.1 mm-2 mm.

4. The electronic assembly according to claim 1,
- wherein the metal frame comprises a first part and a second part, one end of the second part is connected to the first part, and another end of the second part is bent toward the electronic component;
- wherein the second part and the first extension member are staggered from each other in a first direction; and
- wherein the first direction is a thickness direction of the electronic device.

5. The electronic assembly according to claim 1,
- wherein the metal frame comprises a first part and a second part, one end of the second part is connected to the first part, and another end of the second part is bent toward the electronic component;
- wherein the second part at least partially overlaps the first extension member in a first direction; and
- wherein the first direction is a thickness direction of the electronic device.

6. The electronic assembly according to claim 4,
- wherein the first extension member comprises a first extension part and a second extension part connected to the first extension part; and
- wherein one end of the first extension part is connected to the first antenna, another end of the first extension part is connected to one end of the second extension part, and another end of the second extension part is electrically connected to the first feed point.

7. The electronic assembly according to claim 6,
- wherein a projection of the first extension part in a direction perpendicular to the first direction is located on the first antenna and within the at least one slit between the first antenna and the second antenna; and
- wherein a projection of the second extension part in the direction perpendicular to the first direction is located on the second antenna.

8. The electronic assembly according to claim 1, further comprising:
- a first electrical connection member, wherein the first extension member is electrically connected to the first feed point by using the first electrical connection member.

9. The electronic assembly according to claim 1, further comprising:
- a second electrical connection member, wherein the second antenna is electrically connected to the second feed point by using the second electrical connection member.

10. The electronic assembly according to claim 1, further comprising:
- a second extension member;
- wherein the at least two antennas further comprise a third antenna;

wherein the second antenna is located between the first antenna and the third antenna; and wherein one end of the second extension member is connected to an end that is of the third antenna and that faces the second antenna, and another end of the second extension member extends into the gap between the third antenna and the second antenna, and is electrically connected to a third feed point on the circuit board.

11. The electronic assembly according to claim 1, further comprising:

a second extension member;

wherein the at least two antennas further comprise a third antenna;

wherein the first antenna is located between the second antenna and the third antenna; and wherein one end of the second extension member is connected to an end that is of the third antenna and that faces the first antenna, and another end of the second extension member extends into the gap between the third antenna and the first antenna, and is electrically connected to a third feed point on the circuit board.

12. The electronic assembly according to claim 10, further comprising:

a third electrical connection member, wherein the second extension member is electrically connected to the second feed point by using the third electrical connection member.

13. The electronic assembly according to claim 1, further comprising:

a plastic frame, wherein the plastic frame is connected to the metal frame, and the plastic frame is located on one side that is of the metal frame and that faces the electronic component.

14. The electronic assembly according to claim 1, wherein the electronic component is a speaker, a camera, a motor, or a subscriber identity module (SIM) card.

15. An electronic device, comprising:

a first extension member;

a display screen;

a housing; and an electronic assembly;

wherein the display screen and the housing are respectively located on two sides of the electronic assembly;

wherein the electronic assembly comprises a circuit board, an electronic component, and a metal frame;

wherein at least one slit is disposed on the metal frame, so that at least two antennas are formed on the metal frame;

wherein the circuit board and the electronic component are located on one side of the metal frame, and there is a gap between the metal frame and each of the circuit board and the electronic component;

wherein the at least two antennas comprise a first antenna and a second antenna, an orthographic projection of the electronic component on the metal frame covers the first antenna, the at least one slit between the first antenna and the second antenna, and a part of the second antenna, and an orthographic projection of the circuit board on the metal frame covers a part of the second antenna;

wherein one end of the first extension member is connected to an end that is of the first antenna and that is closes to the second antenna, and another end of the first extension member extends into the gap, and is electrically connected to a first feed point on the circuit board; and wherein the second antenna is electrically connected to a second feed point on the circuit board.

16. The electronic device according to claim 15, wherein the electronic device is a foldable screen electronic device;

wherein the display screen comprises an outer screen body, a first inner screen body, and a second inner screen body;

wherein the metal frame of the electronic assembly comprises a first metal frame and a second metal frame; and wherein the first inner screen body and the second inner screen body are located between the outer screen body and the housing, one end of the first metal frame is connected to the outer screen body, another end of the first metal frame is connected to the first inner screen body, one end of the second metal frame is connected to the second inner screen body, and another end of the second metal frame is connected to the housing.

17. The electronic device according to claim 15, wherein there is a distance between the first extension member and a surface that is of the second antenna and that faces the electronic component.

18. The electronic device according to claim 17, wherein the distance between the first extension member and the surface that is of the second antenna and that faces the electronic component is 0.1 mm-2 mm.

19. The electronic device according to claim 15, wherein the metal frame comprises a first part and a second part, one end of the second part is connected to the first part, and another end of the second part is bent toward the electronic component;

wherein the second part and the first extension member are staggered from each other in a first direction; and wherein the first direction is a thickness direction of the electronic device.

20. The electronic device according to claim 15, wherein the metal frame comprises a first part and a second part, one end of the second part is connected to the first part, and another end of the second part is bent toward the electronic component;

wherein the second part at least partially overlaps the first extension member in a first direction; and wherein the first direction is a thickness direction of the electronic device.

* * * * *